United States Patent
Kaltenborn et al.

(10) Patent No.: US 8,790,476 B2
(45) Date of Patent: Jul. 29, 2014

(54) MOLD-FREE RESIN-INSULATED COIL WINDINGS

(75) Inventors: Uwe Kaltenborn, Regensburg (DE); Guido Meier, Wuerenlingen (CH); Stéphane Schaal, Sierentz (FR); Jens Rocks, Freienbach (CH)

(73) Assignee: ABB Research Ltd., Zurich (CH)

( * ) Notice: Subject to any disclaimer, the term of this patent is extended or adjusted under 35 U.S.C. 154(b) by 1393 days.

(21) Appl. No.: 12/051,169

(22) Filed: Mar. 19, 2008

(65) Prior Publication Data

US 2008/0223517 A1   Sep. 18, 2008

Related U.S. Application Data

(63) Continuation of application No. PCT/CH2005/000549, filed on Sep. 20, 2005.

(51) Int. Cl.
*B32B 37/00* (2006.01)

(52) U.S. Cl.
USPC .................................. 156/184; 156/307.7

(58) Field of Classification Search
USPC ............... 156/173, 175, 169, 184, 307.7
See application file for complete search history.

(56) References Cited

U.S. PATENT DOCUMENTS

| | | | | |
|---|---|---|---|---|
| 3,441,459 A | * | 4/1969 | Weidel | 156/195 |
| 3,679,508 A | * | 7/1972 | Weiidel | 156/173 |
| 4,467,973 A | | 8/1984 | Iwata | |
| 5,470,647 A | * | 11/1995 | Zimics et al. | 442/164 |
| 5,954,909 A | | 9/1999 | Davidsohn et al. | |
| 6,752,190 B1 | * | 6/2004 | Boll et al. | 156/433 |

FOREIGN PATENT DOCUMENTS

| | | | |
|---|---|---|---|
| DE | 1 540 133 | | 12/1969 |
| DE | 2051883 A | * | 4/1972 |
| EP | 0 825 624 A2 | | 2/1998 |
| EP | 1 211 052 A1 | | 6/2002 |
| JP | 56-049503 | | 5/1981 |
| JP | 56-155163 | | 12/1981 |
| JP | 58-201320 | | 11/1983 |
| JP | 61-13919 | | 1/1986 |
| JP | 62-282424 | | 12/1987 |
| JP | 64-071113 | | 3/1989 |
| JP | 1-179406 | | 7/1989 |

(Continued)

OTHER PUBLICATIONS

Machine translation of DE 2051883, date unknown.*

(Continued)

*Primary Examiner* — Jeff Aftergut
(74) *Attorney, Agent, or Firm* — Buchanan Ingersoll & Rooney PC (57) ABSTRACT

Mold-free resin-insulated coil windings are obtained by applying continuous fibers embedded in a quasi-solid-state epoxy-resin matrix, e.g. in the form of a tape, to the coil windings. The tape is locally heated up to the melting point of its polymer matrix, and is subsequently pressed against the winding body. The heated and fused resin of the tape, which is pressed onto the coil, flows under pressure into the voids and gaps between the coil windings and fills them up, thereby hermetically insulating the coil windings. After leaving the heating and pressing apparatus the fused epoxy resin becomes solid again. The resulting curing process is thus considerably simplified and shortened, compared to the state of the art.

15 Claims, 4 Drawing Sheets

(56) References Cited

FOREIGN PATENT DOCUMENTS

| JP | 2000-021669 | 1/2000 |
| JP | 2002-8936 | 1/2002 |
| WO | WO 98/22960 A1 | 5/1998 |

OTHER PUBLICATIONS

Derwent Abstract of DE 2051883, date unknown.*

Form PCT/ISA/210 (International Search Report) dated Jun. 2, 2006.
Form PCT/ISA/237 (Written Opinion of the International Searching Authority) dated Jun. 2, 2006.
Form PCT/IPEA/409 (International Preliminary Report on Patentability) dated Aug. 6, 2007.
English translation of the Second Notice of Reason for Rejection mailed in corresponding JP Application No. 2008-531498 on Nov. 15, 2011.

* cited by examiner

MOLD-FREE RESIN-INSULATED COIL WINDINGS

RELATED APPLICATION

This application claims priority as a continuation application under 35 U.S.C. §120 to PCT/CH2005/000549 filed as an International Application on Sep. 20, 2005 designating the U.S., the entire content of which is hereby incorporated by reference in its entirety.

TECHNICAL FIELD

The present disclosure relates to mold-free resin-insulated coil windings, a method, apparatus and use of apparatus for manufacturing such coil windings, and a transformer equipped with such coil windings.

BACKGROUND INFORMATION

Distribution transformers have to show good resistance to mechanical and thermal stress that is associated on one hand with overload and short circuit conditions, and on the other hand with adverse climatic conditions. For said applications dry-type transformers with epoxy-insulated coil windings, reinforced and bound together by roved glass fibers, are state of the art. Such transformers are commercially available from ABB under the trademark RESIBLOC®. A high glass-fiber content (approximately 70% in weight) is instrumental in reaching the required excellent mechanical strength and thermal-shock stability at both high and low temperature values. Epoxy-resin insulated coils according to the RESIBLOC® technique are manufactured by alternately applying a winding layer and a layer consisting of continuous glass fibers. Said fibers are dipped into a liquid epoxy resin bath and are subsequently wound onto the coil windings. The liquid epoxy resin fills the voids between the coil windings. After completing the coil-winding process the liquid epoxy resin is cured in an oven and becomes solid.

State-of-the-art epoxy-insulated transformers show an outstanding product performance. Their manufacture, however, is rather labour- and cost-intensive. The excess of epoxy resin resulting from applying the wetted fibers has to be spread on the coil or removed manually by an operator.

To be suitable for the fiber roving technique, the used epoxy resin has to be of comparably low viscosity. For maintaining a uniform resin distribution in the final curing step, the coil has to be tilted back and forth until gelling and solidifying of the epoxy resin insulation matrix has taken place. Without this tilting the epoxy resin would drip off and accumulate at a bottom end of the coil. The complex curing cycle lasts for more than 10 hours and cannot be shortened easily.

The two above-mentioned reasons lead to significant manufacturing costs. In addition the manual application of the liquid epoxy-resin/anhydride prepolymer mixture in an open wet process can lead to significant exposure of workers to toxic chemical compounds. Furthermore for environmental reasons unused uncured epoxy resin has to be disposed off appropriately.

EP 1 211 052 A1 shows a process and an apparatus for bandaging bodies with fiber-reinforced plastic bands. The fiber-reinforced thermoplastic band is unspooled and is fed, via a fusing apparatus, to a pressing apparatus. The thermoplastic polymer band is melted superficially and is subsequently pressed onto the body to be bandaged.

U.S. Pat. No. 5,954,909 discloses a direct adhesive process for adhering conductors to supports and for adhering a further wire conductor layer onto an adhesive film applied to an existing wire conductor layer. The adhesive is painted or sprayed onto a mold release form, wherein a fiber mat can be incorporated or fiber particles can be embedded. The adhesive layer can be B-staged by thermal treatment, thus forming a 2-D adhesive sheet. For coil production, the adhesive sheet is then arranged patch-wise on a 2-D conductor wire area in a separate, discontinuous placement step. In a subsequent step, heat treatment and over-wrapping is used to bond and press the adhesive sheet onto the existing 2-D conductor layer.

DE 1 540 133 discloses a method for producing coil isolations using a resin tape and a separate hardener tape. At least one tape may comprise mica or glass fibers. The separate tape approach is chosen as an alternative to prepreg tapes in order to improve storage times. In a first step, a coil isolation is produced by winding the combination of resin tape and hardener tape onto a conductor layer. In a second step, the coil is then heated for 1-3 hours for hardening the resin. This hardening process is performed in a separate, discontinuous production step.

SUMMARY

A method for the time- and cost-efficient manufacturing of fiber-reinforced coils with mold-free resin-insulated coil windings is disclosed. In addition the method according to the present disclosure shall be advantageous in view of environmental aspects and operational safety.

The disclosure replaces the state-of-the-art technique of roving epoxy-prepolymer impregnated glass fibers by a technique in which continuous fibers embedded in or simultaneously delivered with a quasi-solid-state epoxy-resin matrix, e.g. in the form of at least one tape, are continuously applied to the coil windings.

A method for manufacturing a resin-insulated coil is disclosed, wherein the coil is reinforced with fibers arranged on the coil in a solid polymeric matrix, wherein 0a winding layer and a fiber/polymer layer are alternately and repeatedly applied, the application of the fiber/polymer layer comprising the following continuously executed steps: continuously delivering at least one continuous tape comprising fibers and a solid polymeric matrix, fusing or activating a section of at least one continuous tape during being delivered, and pressing the fused or activated section of the tape onto the coil during being delivered, and cooling down the tape after leaving the heating or activating and pressing zone.

DETAILED DESCRIPTION

In the method for manufacturing a resin-insulated coil, the coil is reinforced with fibers arranged on the coil in a solid polymeric matrix, wherein a winding layer and a fiber/polymer layer are alternately and repeatedly applied, wherein the application of a fiber/polymer layer comprises the following continuously executed steps:

fusing or activating a section of at least one continuous tape comprising fibers and a solid polymeric matrix, and pressing the fused or activated section of the at least one tape onto the coil.

The at least one tape may be a fiber-reinforced tape comprising fibers embedded in a solid polymeric matrix or a separate fiber tape and polymeric matrix tape. To obtain a void-free insulation of coil windings, the fiber-reinforced tape or the matrix tape is locally heated up to the melting point of its polymer matrix, or it is otherwise activated, e.g. by UV-radiation or chemically, and is subsequently pressed against the winding body. Since the tape is heated up or activated only in a small region, the molten or activated polymer matrix rapidly solidifies after leaving the heating or activation and pressing area. The term fusing or activating refers to any process for making the tape ready or susceptible to bonding it to adjacent layers on the coil through physical and/or chemical processes.

The heated and fused or activated resin of the tape, which is pressed onto the coil, flows under pressure into the voids and gaps between the coil windings and fills them up, thereby hermetically insulating the coil windings. After leaving the heating or activating and pressing apparatus the fused or activated epoxy resin immediately stops flowing and becomes solid again due to fast cooling below the melting point.

The curing of a finished coil can be completed in an oven. The necessary curing time is significantly shorter than that in the prior-art technique. No fully-liquid epoxy resin is present that could drip off or accumulate in a bottom part of the coil. Consequently, there is no need for tilting the coil during the curing cycle. The resulting curing process is thus considerably simplified and shortened compared to the state of the art.

The manufacturing method of the present disclosure is faster, less labour-intensive and more cost-efficient than the state-of-the-art manufacturing method. Since no liquid prepolymeric epoxy resin is present during manufacture, the present disclosure also distinguishes itself positively by increased environmental and operational safety.

A suitable quasi-solid-state polymer or resin matrix for a tape to be used in the present disclosure is for example a B-stage resin, e.g. B-stage epoxy resin. B-stage epoxy resin (also called "resolite" or "resitol") is the term used for a secondary stage in the reaction of certain thermosetting resins. The monomers already have polymerized to a certain degree. The resin can still be partially liquid when heated or can swell in the presence of certain solvents, but can no longer fuse without thermal decomposition or without dissolving completely.

Fiber-reinforced B-stage resin impregnated tapes are commonly called "prepreg" tapes, and are used for the efficient manufacture of products made of compound materials containing, for example, carbon fibers.

Prepreg tapes are available with different systems of polymers and fibers. Apart from the already mentioned pre-hardened epoxy resin, resins such as cyanate ester resin and polyimide resins are used for manufacturing prepregs. These duroplastic materials are suitable for high temperatures, which is advantageous. Thermoplastic polymer systems such as polyester and polypropylene are also used. These types of material are less expensive, but cannot be used above a operating temperature of about 80° C. without losing their mechanical strength. Combinations of the polymers or resins mentioned above can be used, as well.

There exists a variety of different organic and inorganic fiber materials that show large tensile strength and are thus suitable for compound materials and for use in the present disclosure, for example glass fibers, quartz fibers, aramide fibers, dynema fibers (gel spun polyethylene), boron fibers, aluminum oxide fibers, silicium carbide fibers, polybenzimidazole (PBI) fibers, and basalt fibers. Combinations of the fiber types mentioned above can be used, as well. The also widely used carbon fibers are not suitable for use in the present disclosure due to their very low ohmic resistance.

Prepreg tapes are produced by soaking the fibers with liquid prepolymer and subsequent pre-hardening. The chemical hardening process is stopped by rapid cooling down. Prepreg tapes thus must be stored at low temperatures, e.g. in a deep freezer, and are available in wound form on spools.

Figure 1:
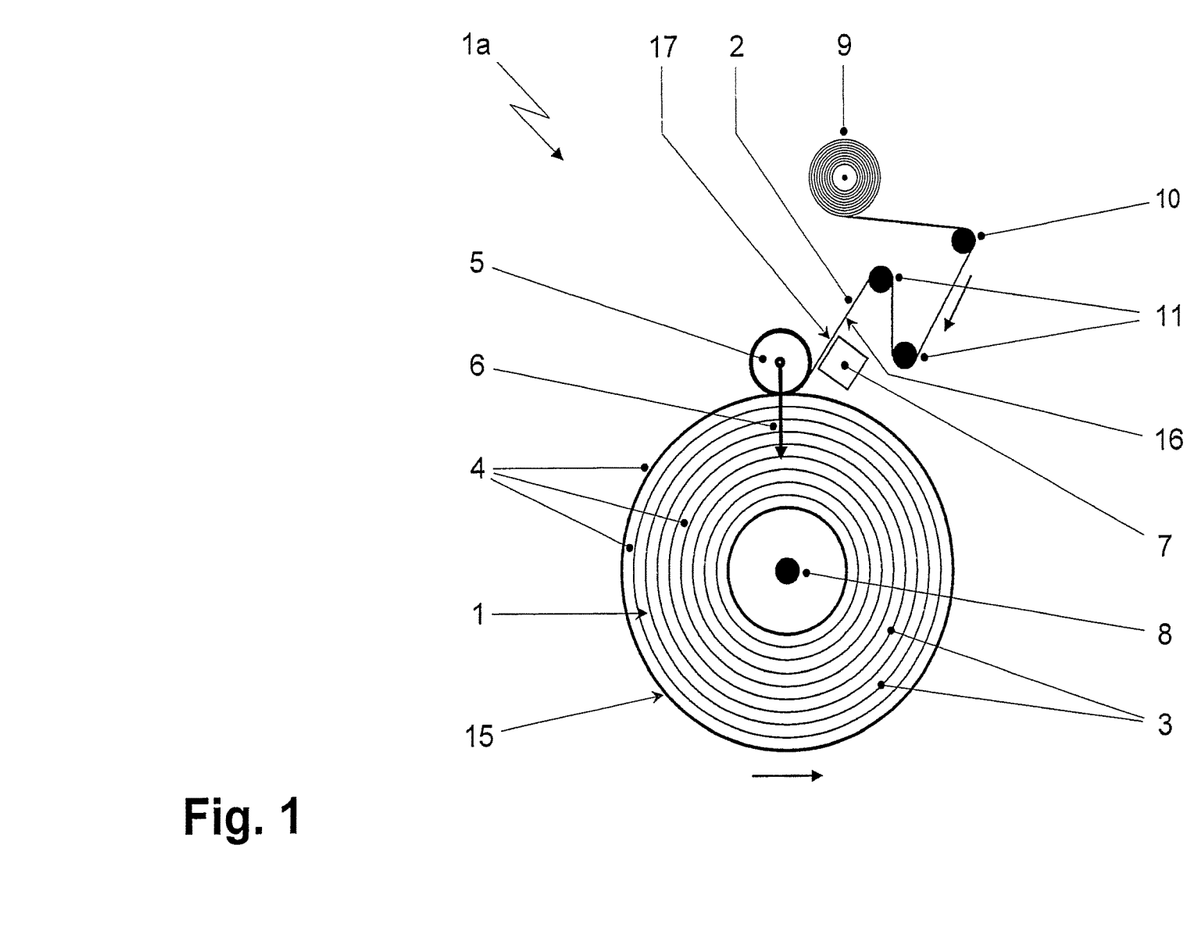
FIG. 1 schematically shows an exemplary apparatus suitable for carrying out the method according to the present disclosure.

FIG. 1 shows an exemplary embodiment of an apparatus 1a according to the present disclosure. A basically cylindrical coil body 1 is rotated around a pivotal axis 8. Alternatively, the apparatus or coil winding head 1a may be rotated around a stationary coil 1. The coil body 1 consists of several coil winding layers 3, embedded in a fiber reinforced resin matrix 4. In particular, the coil 1 comprises winding layers 3 that are isolated against each other by fiber/polymer layers 4 and have electrical connections to provide the continuous winding of a transformer coil 1. The coil 1 may be used as a dry-type transformer coil 1, in particular in a distribution transformer or in a power transformer, preferably in a small power transformer. The coil 1 may also be of any other type of coil, and it may be used for any other specified application for which excellent mechanical, thermal and electrical stability is crucial for its functioning, typically in a medium-voltage order high-voltage surrounding. The method and apparatus 1a according to disclosure allow, in particular, an efficient and environmentally safe manufacturing of dry-type transformer coils 1.

Figure 5:
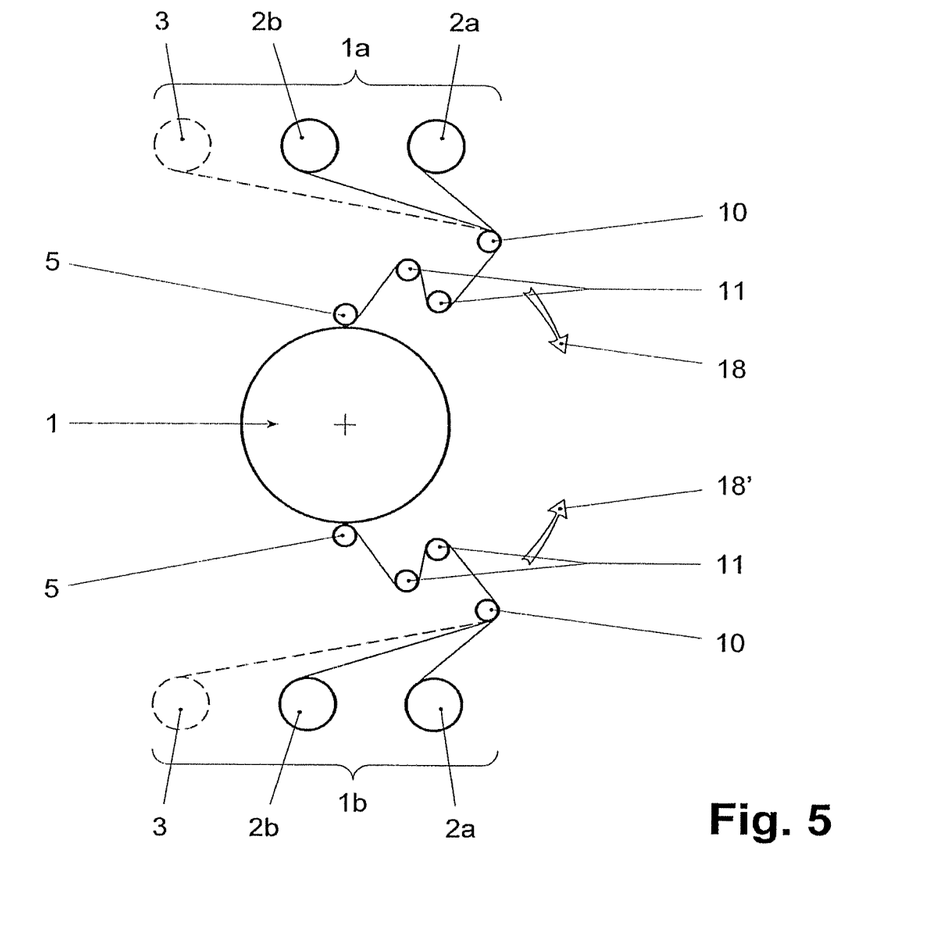
FIG. 5 shows a further embodiment of a winding apparatus having two counter-rotating winding heads.

In more generality, the apparatus 1a, 1b (FIGS. 1, 5) for manufacturing a resin-insulated coil 1, which comprises alternately conducting winding layers 3 and insulating layers 4 containing fibers embedded in a solid polymeric matrix 4, has:

means for continuously delivering 9, 10, 11 at least one tape 2; 2a, 2b comprising fibers and a solid polymeric matrix, in particular a fiber-reinforced tape 2, means for activating 7, 12, 12', 14 locally a section of the fiber-reinforced tape 2 during being delivered, means for supporting and rotating 8 the coil 1, and/or means for rotating 18, 18' at least one winding head 1a, 1b of the apparatus around the coil 1, and means for applying 5 the activated section of the at least one tape 2; 2a, 2b and in particular the fiber-reinforced tape 2 onto the rotating coil 1.

Furthermore, means for applying the winding layers 3 onto the coil 1 and, in particular, means for electrically connecting subsequent winding layers 3 together may be provided. Means for alternating between the application of the tape 2, 2a, 2b and the application of the winding layers 3 onto the coil 1 may be present. Furthermore, means for simultaneous application of the tape 2; 2a, 2b and the winding layers 3 onto the coil 1 may be present.

In an exemplary embodiment of the apparatus 1a the coil 1 to be manufactured is the coil 1 of a transformer, in particular of a dry-type distribution transformer or a small power transformer. Advantageously, the tape 2 is a fiber-reinforced prepreg tape 2 containing fibers, in particular continuous fibers, embedded in a quasi-solid-state resin matrix, such as a B-stage resin matrix, and is wound on a spool 9. Alternatively, as shown in FIG. 5, a first tape 2*a* comprises fibers and a second tape 2*b* comprises a matrix, preferably a quasi-solid-state polymer matrix, in particular a B-stage resin matrix, and both tapes 2*a*, 2*b* are wound on spools 9 and are applicable simultaneously, preferably in an alternatingly layered order.

Furthermore, the means for continuously delivering 9, 10, 11 may comprise a spool 9 carrying the fiber-reinforced tape 2 or separate spools 9 carrying the first or fiber tape 2*a* and the second or matrix tape 2*b* and may comprise rolls 10, 11 for delivering the fiber-reinforced tape 2 or the fiber tape 2*a* and matrix tape 2*b* under controlled tape tension to the rotating coil 1. The rolls 10, 11 may comprise, in particular, a braking roll 10, driving rolls and/or resiliently supported guiding rolls 11. The means for supporting and rotating 8 the coil 1 may comprise a pivotal axis 8 carrying the coil 1; and/or the means for applying 5, 5', 5" the fused or activated section of the fiber-reinforced tape 2 onto the rotating coil 1 may comprise at least one pressing roll 5, 5', 5" for pressing the fused or activated section of the tape 2 onto the coil 1. As well, the winding apparatus may comprise two coil winding heads 1*a*, 1*b*, one rotating clockwise and the other counter-clockwise around the coil 1 for simultaneously winding a clockwise winding 100*a* and a counter-clockwise winding 100*b* of a transformer.

Depending on the used prepolymer matrix of the tape 2, 2*b*, the means for activating may comprise a heating apparatus 7, such as a hot-air blower, a microwave radiation source, an infrared radiation source, or a laser; and/or the means for activating may comprise at least one additional heating apparatus 12, 12' for repeated fusing the freshly applied tape 2; 2*a*, 2*b* onto the coil surface 15; and/or the means for activating may comprise at least one non-thermal activating apparatus 14, such as a UV-source 14, for enhanced hardening the freshly applied tape 2; 2*a*, 2*b* on the coil surface 15. Most preferably, the apparatus 1*a*, 1*b* is used for manufacturing the coil 1 of a transformer, in particular of a distribution transformer or power transformer.

In the following, exemplary embodiments of the method are given in more detail. A tape 2; 2*a*, 2*b*, in particular a fiber reinforced prepreg tape 2, is continuously applied to the surface 15 of the coil body 1, after short local heating of the tape surface 16 facing the coil 1 by the heating apparatus 7. The heat source of heating apparatus 7 may produce hot air or radiation, as outlined above, depending on the used prepolymer matrix of the tape 2, 2*b*. The locally fused tape 2, 2*a*, 2*b* is then pressed against the coil body 1 by a pressing roll 5, thereby exerting a pressing force 6 perpendicular to the surface 15 of the coil body 1. Under the increased pressure/temperature conditions the fused prepolymerized resin starts to flow, closes voids around the coil windings, and fuses with the polymer matrix of the surface 15. After leaving the pressing zone of the pressing roll 5 the tape 2, 2*a*, 2*b*, which is now an integral part of the fiber/resin matrix 4 of the coil body 1, cools down. The outer surface 17 of the part forms the new surface 15 of the coil body 1.

The speed of rotation of the coil body 1 may be chosen constant, with the advantage of a simpler control system and the disadvantage of a varying application speed of the tape 2, 2*a*, 2*b*. The speed may also be adjusted to the current diameter at the position of tape application, to ensure constant process parameters, which results in more uniform material properties throughout the whole body of the coil 1.

In FIG. 1 the prepreg tape 2 is retrieved from a spool 9 and lead via an appropriate system to the heating apparatus 7. FIG. 1 also shows a braking role 10 and resiliently supported rolls 11. Also driving rolls (not shown) may be present. This, however, is to be understood as a simplified example. Systems that ensure constant tape tension and avoid ruptures are known from the prior art.

To built up a coil body 1 according to the present disclosure, layers of coil windings 3 and layers of fiber reinforced polymer 4 are alternately applied to the body 1, until the coil windings 3 are complete and fully isolated.

Prior to winding the coil wire 3 onto the surface of the coil 1, the wire is connected to the previous layer of coil windings 3, e.g. by welding. After finishing a coil winding layer 3, the wire is cut in an appropriate way to allow the connection to the next layer 3. Fiber reinforced polymer tape 2 is then applied to the coil body surface 15, using the apparatus 1*a* according to the present disclosure, until the polymer layer 4 reaches the thickness that ensures the desired mechanical stability of the coil 1 and electrical isolation of the coil wires 3. On the surface of the resulting polymer layer 4 the next layer of coil windings 3 is applied. After the last layer of coil windings 3 a last one polymer layer 4 is applied, which may be of greater thickness than the other layers 4, to ensure a very good isolation against the surrounding environment.

In a preferred embodiment the application process is automated, and hence is made more reliable and robust, e.g. by placing the tape 2, 2*a*, 2*b* on the coil windings 3 by a robot. During the application of the tape 2 the fiber/polymer layer 4 may be cured continuously and/or repeatedly. Moreover, the process of alternately applying the coil windings 3 and applying the glass fiber reinforcement 4, at the same time insulating the coil windings 3, can be realized fully automated, without a human operator, in particular by using a robot.

As shown in the embodiment of FIG. 5, the alternate application of the fiber/polymer layer 4 and the wire layer 3 can be carried out in a simultaneous manufacturing step. For this purpose an additional spool with copper wire 3 is fed to the winding head 1*a* or 1*b* and applied to the coil 1.

Figure 4:
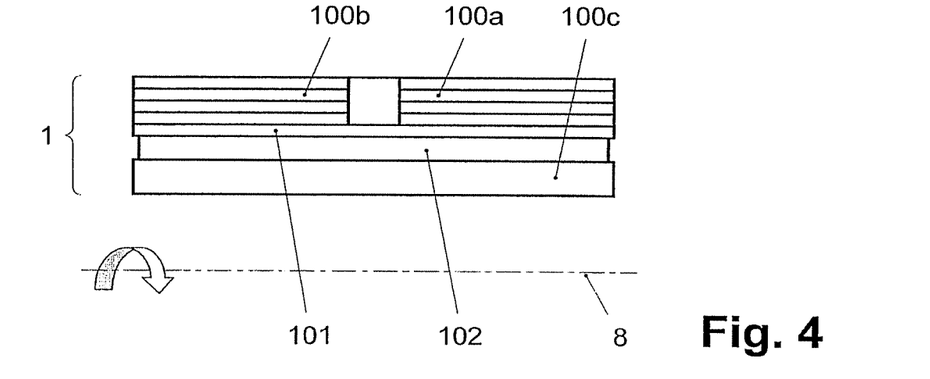
FIG. 4 shows a known transformer design having a low-voltage winding and two secondary windings.

FIG. 4 shows a known transformer design comprising a low-voltage winding 100*c*, separated from two secondary voltage windings 100*a*, 100*b* by an insulation 101 and a cooling channel 102. In this arrangement the secondary windings 100*a*, 100*b* have typically an opposite sense of rotation, i.e. clockwise 100*a* and counter-clockwise 100*b*. In order to achieve this, the winding apparatus 1*a*, 1*b* shown in FIG. 5 has two coil winding heads 1*a*, 1*b*, one winding head 1*a* rotating clockwise around the coil 1 for manufacturing the clockwise winding 100*a* and the other winding head 1*b* rotating clockwise around the coil 1 for manufacturing the counter-clockwise winding 100*b* of the transformer. the winding heads 1*a*, 1*b* are axially displaced from one another.

To complete the curing of the polymer matrix, the finished coil 1 can be heated in an oven, the resin becoming an unfusable so-called C-stage resin. The necessary curing time for B-stage epoxy resin is significantly shorter, i.e., 1 to 2 hours, compared to the 10 hours of liquid (so-called A-stage) epoxy-resin technique. Since the epoxy resin matrix is already solid, except for the above mentioned short heating and pressing step, there is no epoxy resin present that could drip off or accumulate in the bottom part of the coil. Consequently there is no need for tilting the coil 1 during the curing cycle. The resulting curing process is considerably simplified and shortened, compared to the state of the art. It is also possible to carry out the final curing under pressure in an autoclave, thereby further increasing the mechanical stability of the composite material structure of the coil.

Figure 2:
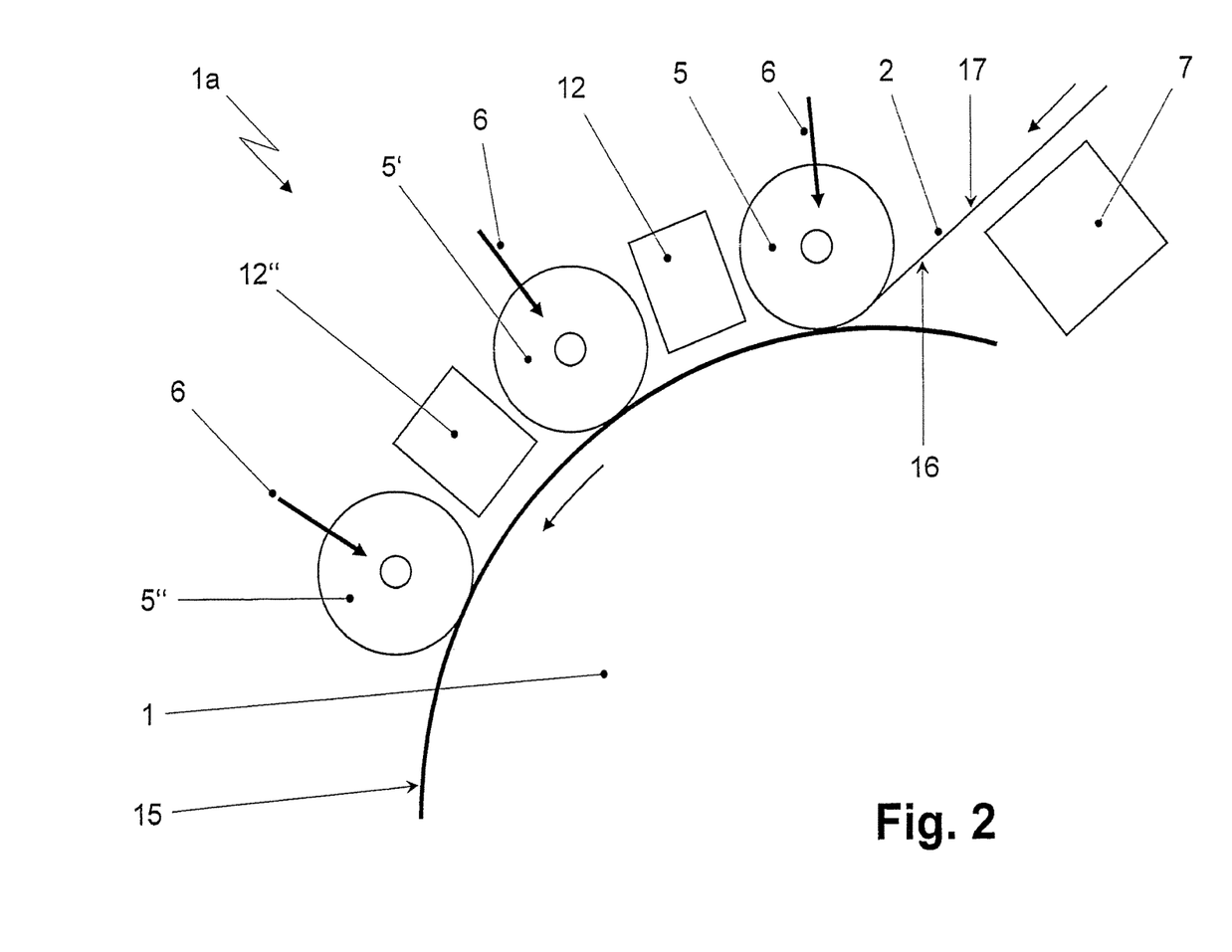
FIG. 2 shows a detail of another embodiment of an apparatus suitable for carrying out the method according to the present disclosure.

FIG. 2 shows the heating and pressing elements of another exemplary embodiment of an apparatus 1*a* according to the present disclosure. After local fusing of the inner surface 16, the fiber reinforced tape 2 is applied to the coil body 1 using the pressing roll 5. To increase the physical and chemical connection between the freshly applied tape 2 and the surface 15, the tape 2 is heated a second time by a heating apparatus 12 and pressed onto the surface 15 by a second pressing roll 5'. It is also possible to add a third heating apparatus 12' and a third pressing roll 5". Depending on the prepolymer system used the additional heating apparatuses 12, 12' may also be replaced by a ultraviolet light source 14, since certain polymers can be hardened by UV radiation.

Figure 3:
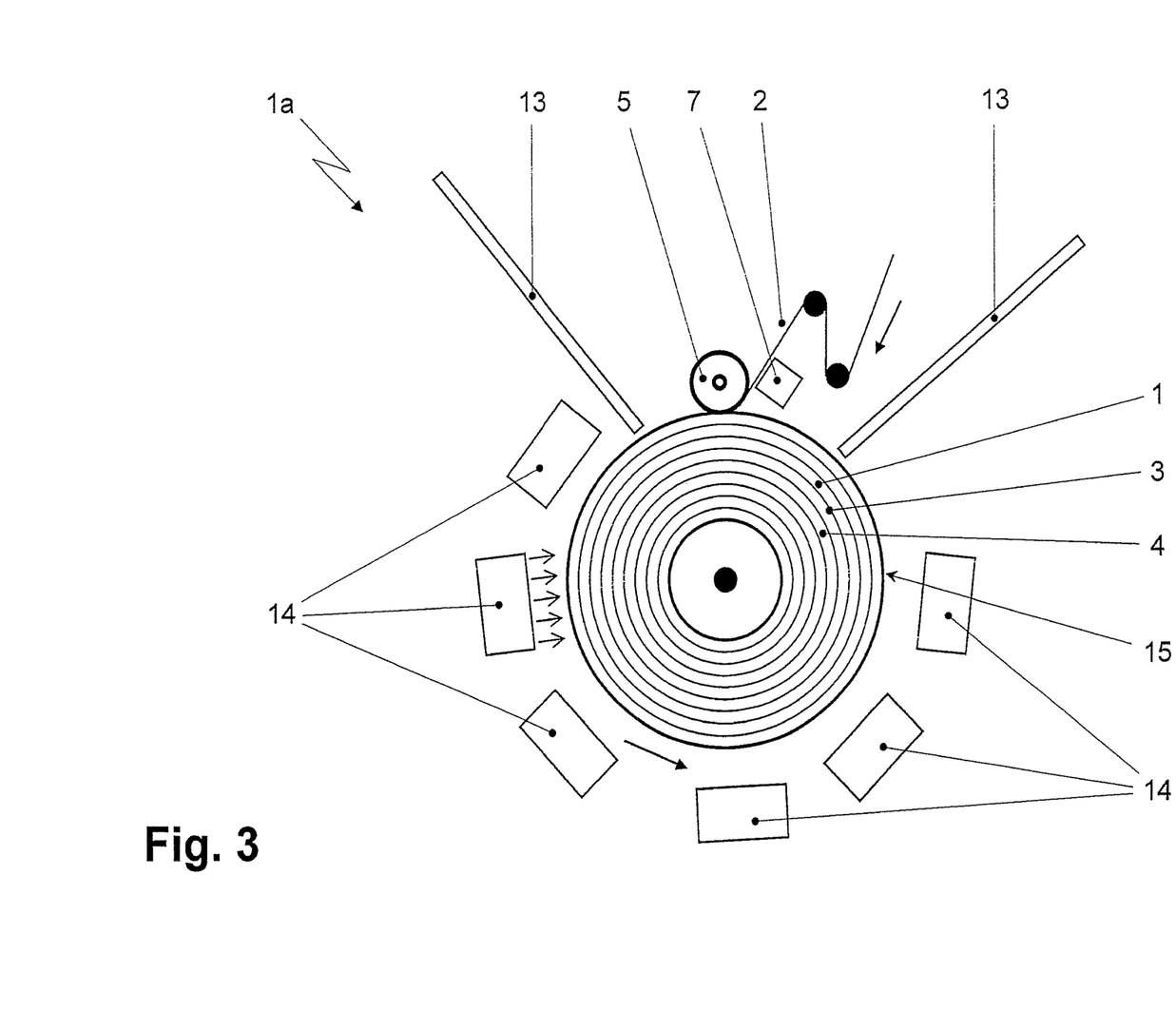
FIG. 3 shows a further embodiment of an apparatus suitable for carrying out the method according to the present disclosure.

FIG. 3 shows a further exemplary embodiment of an apparatus 1a according to the present disclosure. The complete polymer surface 15 of the coil body 1 is irradiated by one or more irradiation apparatuses 14. Depending on the used prepreg polymer system the used radiation may be infrared light for heat curing the polymer, and/or ultraviolet or blue light for inducing the chemical reactions resulting in hardening of the polymer. To protect the tape 2 prior to application, opaque walls 13 divide the tape 2 from the light sources 14. Instead of infrared radiation sources 14 also hot air blowers may be used.

Further objects of the disclosure are a resin-insulated coil 1, in particular for a dry-type transformer, manufactured according to the method described above, and a transformer, in particular a distribution transformer or a power transformer, containing such a resin-insulated coil 1 manufactured according to the method described above.

Advantages achieved by the disclosure are numerous. The fiber layers 4 add mechanical tenacity and thermal and dielectric strength to the polymer or resin. The fiber layers 4 also reduce the amount of expensive resin needed. Furthermore, the use of a separate fiber tape 2a and matrix tape 2b allows to replace the relatively costly prepreg tape 2. The thickness of the fiber/polymer layers 4 shall be chosen to meet the specified mechanical, thermal and electrical performance of the transformer coil 1 and depends on the transformer design. The production method according to disclosure replaces the dirty wet winding process, is very suitable for automated winding procedures, reduced health exposure of production personnel, and results in transformer coils 1 of improved quality and dielectric performance and reliability. Dry transformers containing such coils 1 have reduced partial discharge. As well, the danger of burning and exploding of such transformer coils 1 is minimal.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 coil body
100a first winding, clockwise winding
100b second winding, counter-clockwise winding, left-hand winding
100a, 100b secondary voltage windings
100c low-voltage winding
101 insulation
102 cooling channel
1a, 1b apparatus, winding apparatus; coil winding heads
2 fiber reinforced tape
2a first tape, fiber tape
2b second tape, matrix tape
3 coil winding layer
4 fiber/polymer layer
5, 5', 5" pressing roll
6 pressing force
7 heating apparatus
8 pivotal axis
9 spool(s)
10 braking roll
11 resiliently supported roll(s), guiding roll(s)
12, 12' heating apparatus(es)
13 opaque wall(s)
14 irradiation apparatus(es)
15 surface of coil body
16 inner surface of tape
17 outer surface of tape
18, 18' rotation
18 clockwise rotation
18' counter-clockwise rotation

What is claimed is:

1. A method for manufacturing a resin-insulated transformer coil, wherein the coil is reinforced with fibers arranged on the coil in a quasi-solid state polymeric matrix, wherein a winding layer and a fiber/polymer layer are alternately and repeatedly applied, the application of the fiber/polymer layer comprising the following continuously executed steps:
   continuously delivering a layer consisting of a continuous winding layer;
   continuously delivering at least one continuous tape comprising an unimpregnated fiber layer and a quasi-solid state polymeric matrix;
   fusing or activating a section of at least one continuous tape during delivery;
   pressing the fused or activated section of the tape onto the winding layer during the continuous delivering; and
   cooling down the tape after leaving a zone of the fusing or activating and pressing.

2. The method according to claim 1, wherein the coil is the coil of a dry-type distribution transformer or a small power transformer.

3. The method according to claim 1, wherein after application of a last fiber/polymer layer, the coil is cured in an oven or an autoclave.

4. The method according to claim 1, wherein a clockwise winding of a dry-type transformer is manufactured by a first coil winding head rotating clockwise around the coil, and a counter-clockwise winding of the dry-type transformer is manufactured by a second coil winding head rotating counter-clockwise around the coil, wherein both coil winding heads rotate simultaneously and are axially displaced from one another.

5. The method according to claim 1, comprising:
   including the resin-insulated coil in the transformer.

6. The method according to claim 1, further comprising:
   after pressing the fused or activated section of the tape onto the coil during continuous delivering, repeatedly fusing the freshly applied tape onto a coil surface.

7. The method according to claim 1, wherein
   the fiber/polymer layer is continuously and/or repeatedly cured during application of the tape; and/or
   application of the continuous tape is carried out fully automated.

8. The method according to claim 7, wherein alternate application of the fiber/polymer layer and the winding layer is carried out fully automated, using a robot and in a simultaneous manufacturing step.

9. The method according to claim 1, wherein alternate application of the fiber/polymer layer and the winding layer is carried out fully automated, using a robot and in a simultaneous manufacturing step.

10. The method according to claim 9, wherein after application of a last fiber/polymer layer the coil is cured in an oven or an autoclave.

11. The method according to claim 9, wherein during manufacturing, the coil is rotated about an axis and/or a winding apparatus is rotated around the coil.

12. The method according to claim 1, wherein during manufacturing, the coil is rotated about an axis and/or a winding apparatus is rotated around the coil.

13. The method according to claim 12, wherein a clockwise-winding of a dry-type transformer is manufactured by a first coil winding head rotating clockwise around the coil, and a counter-clockwise winding of the dry-type transformer is manufactured by a second coil winding head rotating counter-clockwise around the coil, wherein both coil winding heads rotate simultaneously and are axially displaced from one another.

14. A method for manufacturing a resin-insulated transformer coil, wherein the coil is reinforced with fibers arranged on the coil in a quasi-solid state polymeric matrix, wherein a winding layer and a fiber/polymer layer are alternately and repeatedly applied, the application comprising the following continuously executed steps:
continuously delivering a continuous winding layer;
continuously delivering a first continuous tape comprising unimpregnated fibers and a second continuous tape comprising a quasi-solid state polymeric matrix simultaneously in an alternating order;
fusing or activating a section of at the second continuous tape during delivery;
pressing the fused or activated section of the at least one fused or activated continuous tape onto the winding layer during the continuous delivering; and
cooling down the first and second tapes after leaving a zone of the fusing or activating and pressing.

15. A method for manufacturing a resin-insulated transformer coil, wherein the coil is reinforced with fibers arranged on the coil in a quasi-solid state polymeric matrix, wherein a winding layer and a fiber/polymer layer are alternately and repeatedly applied, the application comprising the following continuously executed steps:
continuously delivering a layer consisting of a winding layer;
continuously delivering at least one continuous tape comprising unimpregnated fibers and a quasi-solid state polymeric matrix;
fusing or activating a section of at least one continuous tape during delivery;
pressing the fused or activated section of the tape onto the winding layer during the continuous delivering;
cooling down the tape after leaving a zone of the fusing or activating and pressing,
wherein the quasi-solid state polymeric matrix of each of the at least one tape consists of a B-stage resin matrix.

* * * * *